G. W. WELLS.
Thill-Coupling.

No. 199,884. Patented Jan. 29, 1878.

Attest:
H. D. Perrine.
John North.

Geo. W. Wells.
Inventor:
By James L. Norris.
Atty.

UNITED STATES PATENT OFFICE.

GEORGE W. WELLS, OF MIDDLETOWN, CONNECTICUT.

IMPROVEMENT IN THILL-COUPLINGS.

Specification forming part of Letters Patent No. 199,884, dated January 29, 1878; application filed January 5, 1878.

*To all whom it may concern:*

Be it known that I, GEORGE W. WELLS, of Middletown, in the county of Middlesex and State of Connecticut, have invented certain new and useful Improvements in Couplings for Carriage-Shafts, Pitman-Connections, &c., of which the following is a specification:

My invention relates to an improved coupling for carriage-shafts, pitman-connections, and similar joints.

Its object is to furnish a coupling having no lateral play between its parts, and capable of adjustment to compensate for wear, so as to prevent rattling or jarring.

To this end my improvement consists in the combination, with the conical eye of a carriage-shaft, pitman, or similar article, of a shackle consisting of two ears having screw-bolt holes of different sizes, a conical bolt having cylindrical screw-threaded portions at both ends and fitting said eye and shackle, and jam-nuts fitting upon both ends of said bolt outside the shackle, whereby the bolt is prevented from turning.

Figure 1:
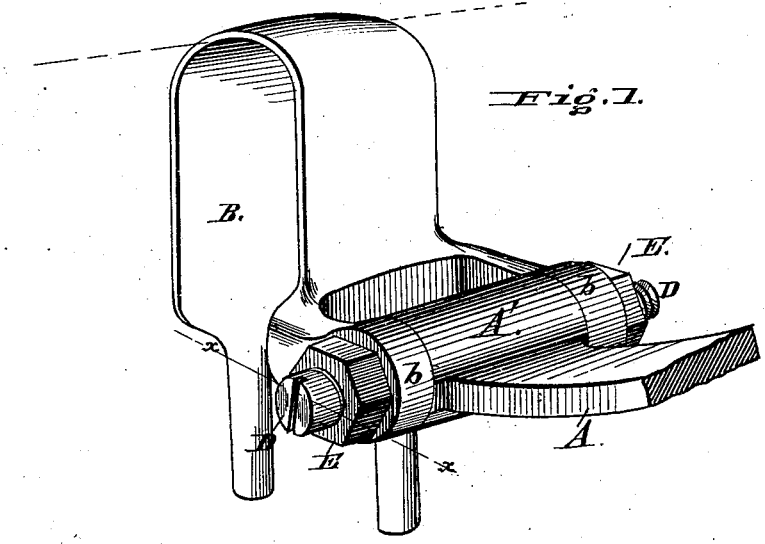
Figure 2:
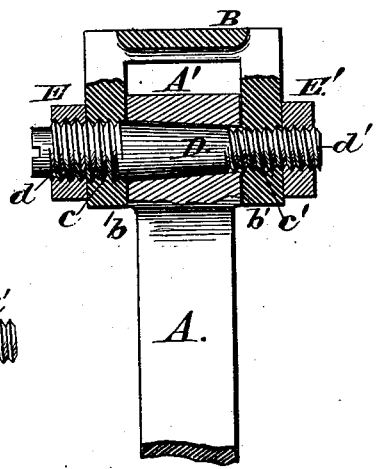
Figure 3:
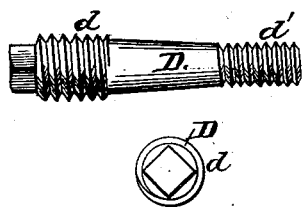

In the drawings, Figure 1 represents a perspective view of a carriage-shaft coupling constructed according to my invention. Fig. 2 is a central longitudinal section taken in the line *x x*, Fig. 1. Fig. 3 is a modified form of bolt.

The letter A designates a carriage-shaft, and A' its eye, the opening of which is in the form of a hollow frustum of cone. B is an axle-clip, provided with a shackle consisting of the ears *b b'*, having screw-threaded holes *c c'*, the hole *c* of the outer ear having a greater diameter than that of the inside ear. D is a conical bolt, having at opposite ends the screw-threaded cylindrical portion *d d'*, of size to fit the holes of the ears *c c'*.

The end of the shaft A being placed between the ears of the shackle, the small end of the bolt is inserted through the hole of ear *c* and through the hollow cone-shaped eye A', and is engaged with the screw-thread of the hole in eye *c'*. A few rotations of the bolt bring the larger screw-threaded portion of the bolt into position to engage with the screw-threads of the hole in ear *c*. Both ends of the bolt being now engaged with the ears of the shackle, said bolt is advanced until its smooth conical portion fits sufficiently close in the eye to hold said eye snugly and prevent lateral play thereof. The jam-nuts E and E' are then screwed firmly against the outside of the ear *c'*, to prevent the bolt from turning so as to become loose, and the coupling is complete and ready for use.

When the parts become worn so as to permit rattling, jarring, or unevenness of operation, the jam-nuts should be loosened, the bolt tightened up, and the jam-nut again screwed up against the ear of the shackle.

The conical shape of the bolt and eye, as is obvious, renders the bolt adapted to wedge into the eye as tightly as desired, and the ears *c c'* being both engaged with the screw-threads of the bolt, any lateral strain upon one of said ears will be communicated through the bolt to the other ear, so that said ears are not liable to breakage or displacement, and divide between them all lateral strain upon the shackle in any direction.

As the bolt, on account of the action of the jam-nuts, can only turn when desired, its circumferential wear may be regulated by turning it so the pulling-strain of carriage-shafts may be for a time on different portions, so that said bolt will wear evenly.

The only difference between the forms of bolts shown is that the bolt shown in Figs. 1 and 2 has a slitted head, and is to be driven by a screw-driver, while that shown in Fig. 3 has a square head, adapted for the use of a wrench.

I am aware that a perfectly-straight bolt has been screw-threaded at or near each end, which screw-threaded portions are connected with screw-threads in the ears of a shaft-coupling, said bolt being provided with screw-nuts to retain it in position; but such is not my invention, and is not claimed by me, as there is no means provided for compensating for the wear of the bolt or the eye of the shaft-iron; and I am also aware that it is not new to employ a tapering bolt in various combinations.

What I claim is—

The combination, with the conical eye of a carriage-shaft, pitman, or similar article, of a shackle consisting of two ears having screw-bolt holes of different sizes, a conical bolt having a cylindrical screw-threaded portion at each end and fitting said eye and shackle, and jam-nuts upon both ends of said bolt outside the shackle, whereby the bolt is prevented from turning.

In testimony that I claim the foregoing I have hereunto set my hand in the presence of the subscribing witnesses.

GEORGE W. WELLS.

Witnesses:
 JAMES L. NORRIS,
 JOHN NORTH.